US010089568B2

(12) United States Patent
Mosteller

(10) Patent No.: US 10,089,568 B2
(45) Date of Patent: Oct. 2, 2018

(54) IC CHIP CARD WITH INTEGRATED BIOMETRIC SENSOR PADS

(71) Applicant: CPI Card Group—Colorado, Inc., Littleton, CO (US)

(72) Inventor: Barry Mosteller, Castle Pines, CO (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 0 days.

(21) Appl. No.: 15/566,602

(22) PCT Filed: May 31, 2017

(86) PCT No.: PCT/US2017/035231
§ 371 (c)(1),
(2) Date: Oct. 13, 2017

(87) PCT Pub. No.: WO2017/210305
PCT Pub. Date: Dec. 7, 2017

(65) Prior Publication Data
US 2018/0082165 A1    Mar. 22, 2018

Related U.S. Application Data

(60) Provisional application No. 62/344,285, filed on Jun. 1, 2016.

(51) Int. Cl.
*G06K 19/07*  (2006.01)
*G06K 19/077*  (2006.01)
(Continued)

(52) U.S. Cl.
CPC ..... *G06K 19/0723* (2013.01); *G06K 7/10297* (2013.01); *G06K 19/07354* (2013.01);
(Continued)

(58) Field of Classification Search
CPC .......... G06K 19/0716; G06K 19/0718; G06K 19/0723; G06K 19/07354;
(Continued)

(56) References Cited

U.S. PATENT DOCUMENTS 3,374,530 A    3/1968  Flanders et al.
3,688,088 A    8/1972  Brown et al.
(Continued)

FOREIGN PATENT DOCUMENTS

EP    2073154 A1    6/2009
WO    2015007762 A1    1/2015

*Primary Examiner* — Suezu Ellis
(74) *Attorney, Agent, or Firm* — Marsh Fischmann & Breyfogle LLP; Thomas R. Marsh

(57) ABSTRACT

An integrated circuit (IC) chip card includes a card body and an integrated IC chip module located in a recess provided by the card body on one side thereof. The IC chip module includes a substrate having outward-facing and inward-facing surfaces, and a first plurality of contact pads supportably interconnected to the outward-facing surface of the substrate for contact engagement with at least one appendage of a user. The IC chip module further includes a first IC chip supportably interconnected to the inward-facing surface of the substrate and electrically interconnected to the first plurality of contact pads for processing a biometric signal received therefrom. The IC chip module may also include a second plurality of contact pads supportably interconnected to the outward-facing surface of the substrate for engaging a contact card reader for contact communication signal transmissions and/or a first antenna supportably interconnected to the inward-facing surface of the substrate for contactless communication signal transmissions with a contactless card reader. Communication signal processing may be completed by the first IC chip and/or a second IC chip supportably interconnected to the inward-facing surface of the substrate.

27 Claims, 5 Drawing Sheets

(51) Int. Cl.
*H01L 23/66* (2006.01)
*H01L 25/065* (2006.01)
*G06K 19/073* (2006.01)
*G06K 7/10* (2006.01)

(52) U.S. Cl.
CPC ........ *G06K 19/07722* (2013.01); *H01L 23/66* (2013.01); *H01L 25/0655* (2013.01); *H01L 2223/6616* (2013.01); *H01L 2223/6677* (2013.01)

(58) Field of Classification Search
CPC ....... G06K 19/07722; G06K 19/07743; G06K 19/07745; G06K 19/07747; G06K 19/0775; G06K 19/07766; G06K 19/07767; G06K 19/07769; G06K 19/07775
See application file for complete search history.

(56) References Cited

U.S. PATENT DOCUMENTS

| | | | |
|---|---|---|---|
| 3,855,033 A | 12/1974 | Staats | |
| 3,896,726 A | 7/1975 | Staats | |
| 3,949,501 A | 4/1976 | Andrews et al. | |
| 4,097,279 A | 6/1978 | Whitehead | |
| 4,223,918 A | 9/1980 | Smoczynski | |
| 4,568,824 A | 2/1986 | Gareis et al. | |
| 4,592,976 A | 6/1986 | Whitehead | |
| 4,677,285 A | 6/1987 | Taniguchi | |
| 4,746,392 A | 5/1988 | Hoppe | |
| 4,897,533 A | 1/1990 | Lyszczarz | |
| 4,931,629 A | 6/1990 | Frankfurt | |
| 5,215,792 A | 6/1993 | Miller | |
| 5,513,019 A | 4/1996 | Cueli | |
| 5,559,370 A | 9/1996 | Berney | |
| 5,667,876 A | 9/1997 | Radlicz | |
| 5,690,773 A | 11/1997 | Fidalgo et al. | |
| 5,719,950 A | 2/1998 | Osten et al. | |
| 5,877,941 A | 3/1999 | Ryu | |
| 5,965,867 A | 10/1999 | Haghiri-Tehrani | |
| 6,006,456 A | 12/1999 | Hiromachi et al. | |
| 6,025,283 A | 2/2000 | Roberts | |
| 6,164,548 A | 12/2000 | Curiel | |
| 6,202,931 B1 | 3/2001 | Billebaud | |
| 6,239,976 B1 | 5/2001 | Templeton et al. | |
| 6,325,285 B1 | 12/2001 | Baratelli | |
| 6,352,604 B2 | 3/2002 | Droz | |
| 6,378,774 B1 | 4/2002 | Emori et al. | |
| 6,471,128 B1 | 10/2002 | Corcoran et al. | |
| 6,644,552 B1 | 11/2003 | Herslow | |
| 6,942,156 B2 | 9/2005 | Ohta et al. | |
| 6,986,467 B2 | 1/2006 | Takahashi et al. | |
| 7,269,021 B2 | 9/2007 | Gundlach et al. | |
| 7,287,704 B2 | 10/2007 | Herslow | |
| 7,306,163 B2 | 12/2007 | Scholz et al. | |
| 7,398,917 B2 | 7/2008 | Aibazov et al. | |
| 7,413,128 B2 | 8/2008 | Waldo et al. | |
| 7,494,057 B2 | 2/2009 | Lasch et al. | |
| 7,503,503 B2 | 3/2009 | Riedl et al. | |
| 7,530,491 B2 | 5/2009 | Lasch et al. | |
| 7,558,965 B2 | 7/2009 | Wheeler et al. | |
| 7,588,184 B2 | 9/2009 | Gandel et al. | |
| D602,986 S | 10/2009 | Skelding et al. | |
| 7,689,833 B2 | 3/2010 | Lange | |
| D623,690 S | 9/2010 | Skelding et al. | |
| 7,819,310 B2 | 10/2010 | Lasch et al. | |
| 7,823,777 B2 | 11/2010 | Varga et al. | |
| D635,186 S | 3/2011 | Skelding et al. | |
| 7,971,786 B2 | 7/2011 | Lasch et al. | |
| D643,062 S | 8/2011 | Skelding et al. | |
| 8,033,457 B2 | 10/2011 | Varga et al. | |
| 8,061,618 B2 | 11/2011 | Mosteller | |
| 8,079,514 B2 | 12/2011 | Lasch et al. | |
| 8,100,337 B2 | 1/2012 | Artigue et al. | |
| 8,186,582 B2 | 5/2012 | Varga et al. | |
| 8,305,764 B2 | 11/2012 | Rietzler | |
| 8,317,108 B2 | 11/2012 | Patrice | |
| 8,413,894 B2 | 4/2013 | Bona et al. | |
| 8,434,675 B2 | 5/2013 | Faith | |
| 8,448,868 B2 | 5/2013 | Mueller-Hipper et al. | |
| 8,594,730 B2 | 11/2013 | Bona et al. | |
| 8,672,232 B2 | 3/2014 | Herslow | |
| 8,807,437 B2 | 8/2014 | Reed et al. | |
| 8,857,722 B2 | 10/2014 | Mosteller | |
| 8,944,810 B2 | 2/2015 | Herslow | |
| 8,994,498 B2 | 3/2015 | Agrafioti et al. | |
| 9,058,548 B2 | 6/2015 | Reed et al. | |
| 9,117,155 B2 | 8/2015 | Mosteller | |
| 9,189,901 B2 | 11/2015 | Agrafioti et al. | |
| 9,430,724 B2 | 8/2016 | Mosteller | |
| 9,779,343 B2 | 10/2017 | Mosteller | |
| 2002/0070279 A1 | 6/2002 | Zausner | |
| 2004/0011877 A1 | 1/2004 | Reppermund | |
| 2005/0150947 A1 | 7/2005 | Goodman et al. | |
| 2005/0212690 A1 | 9/2005 | Nishikawa | |
| 2005/0230822 A1 | 10/2005 | Tran | |
| 2006/0124753 A1 | 6/2006 | Scholz et al. | |
| 2007/0013396 A1* | 1/2007 | Kim .................... | G06K 19/077 361/767 |
| 2007/0089831 A1 | 4/2007 | Florentino et al. | |
| 2008/0227284 A1* | 9/2008 | Rebelo .................... | H01L 24/05 438/617 |
| 2008/0245879 A1 | 10/2008 | Artigue et al. | |
| 2009/0128338 A1 | 5/2009 | Arai et al. | |
| 2009/0169776 A1 | 7/2009 | Herslow | |
| 2009/0321519 A1 | 12/2009 | Tran | |
| 2011/0020606 A1 | 1/2011 | Herslow et al. | |
| 2011/0031319 A1 | 2/2011 | Kiekhaefer et al. | |
| 2011/0047036 A1 | 2/2011 | Foran-Owens et al. | |
| 2011/0073660 A1 | 3/2011 | Lawyer | |
| 2011/0108629 A1 | 5/2011 | Mueller-Hipper et al. | |
| 2011/0140841 A1 | 6/2011 | Bona et al. | |
| 2011/0189620 A1 | 8/2011 | Herslow | |
| 2012/0204419 A1 | 8/2012 | Varga et al. | |
| 2012/0313754 A1 | 12/2012 | Bona | |
| 2013/0228628 A1 | 9/2013 | Bona et al. | |
| 2013/0255078 A1 | 10/2013 | Cox | |
| 2013/0255848 A1 | 10/2013 | Cox | |
| 2013/0258622 A1 | 10/2013 | Cox | |
| 2013/0260065 A1 | 10/2013 | Cox | |
| 2013/0261262 A1 | 10/2013 | Cox | |
| 2013/0320095 A1 | 12/2013 | Blum | |
| 2014/0052630 A1 | 2/2014 | Bona et al. | |
| 2014/0104133 A1* | 4/2014 | Finn .................. | G06K 19/07769 343/866 |
| 2015/0049925 A1 | 2/2015 | Lowe | |
| 2015/0116086 A1 | 4/2015 | Kim et al. | |
| 2015/0136858 A1 | 5/2015 | Finn et al. | |
| 2015/0155039 A1 | 6/2015 | Tran et al. | |
| 2016/0155039 A1* | 6/2016 | Neymann .......... | G06K 19/0718 235/488 |
| 2016/0335426 A1* | 11/2016 | Cherry ............... | G06K 19/0718 |
| 2017/0116505 A1* | 4/2017 | Suwald .................. | G06K 19/07 |
| 2017/0132507 A1* | 5/2017 | Blythe ............. | G06K 19/07745 |
| 2017/0150891 A1* | 6/2017 | Tsuchimoto ............. | A61B 5/02 |

* cited by examiner

IC CHIP CARD WITH INTEGRATED BIOMETRIC SENSOR PADS

RELATED APPLICATIONS

This application claims priority to U.S. Patent Application No. 62/344,285, filed Jun. 1, 2016, entitled "IC CHIP CARD WITH INTEGRATED BIOMETRIC SENSOR PADS", which application is incorporated herein by reference in its entirety

BACKGROUND

Integrated circuit (IC) chip cards are increasingly utilized as payment cards (e.g. credit cards, debit cards, store-value cards, etc.). In that regard, card issuer payment institutions issue chip cards that each have a corresponding specific payment account administered by or on behalf of the card issuer. For example, banks issue chip cards to customers having payment accounts administered by the banks.

With the increased use of payment chip cards, attendant security risks continue to escalate. Such security concerns exist in relation to fraudulent use of lost and stolen payment chip cards, and in relation to the wrongful obtainment of proprietary payment account-related data transmitted between a payment chip card and chip card reader during use of the payment chip card. In the later regard, wrongfully obtained, proprietary payment account-related data may be utilized in fraudulent transactions that involve charges to a payment account without use of an associated payment chip card (e.g. on-line payment transactions).

To address such security concerns, numerous data encryption solutions and elaborate IC chip designs have been proposed. Further, recent efforts have explored the viability of utilizing biometric data to authenticate a user of given a payment chip card as being the issuee to whom the payment chip card has been issued for exclusive use by a payment institution. To date, such efforts have not resulted in a practical solution that may be readily implemented in a cost effective manner by the payment card industry.

SUMMARY

In one embodiment, a chip card is disclosed that includes a card body and an integrated circuit (IC) chip module located in a recess provided by the card body on one side of the chip card. The integrated IC chip module may include a substrate (e.g. an electrically non-conductive substrate) having an outward-facing surface and an inward-facing surface, and a first plurality of contact pads (e.g. electrically conductive/isolated pads) supportably interconnected to the outward-facing surface of the substrate for contact engagement with at least one appendage of a user. In that regard, the first plurality of contact pads may be advantageously provided to function as integrated biometric sensor pads. Further, the integrated IC chip module may include a first IC chip supportably interconnected to the inward-facing surface of the substrate and electrically interconnected to the first plurality of contact pads for processing a biometric signal received therefrom.

As will be described further hereinbelow, the disclosed chip card may be provided with additional features to function as a contact or dual contact and contactless payment chip card, e.g. in compliance with ISO/IEC Standards 7816-2 and 14443 hereby incorporated by reference. In turn, processing of the biometric signal may be completed by the first IC chip to authenticate a user and thereby "unlock" the chip card for transactional use.

The provision of an integrated IC module, having a substrate that supports contact pads for providing and an IC chip for processing a biometric signal on opposite sides of the substrate, facilitates chip card production and customization. For example, during chip card production the integrated IC chip module may be readily handled and positioned as a single unit. Additionally, the specific IC chip and layout of contact pads utilized in a given chip card may be readily customized by a given customer with minimal or no required variation of the card body utilized. Further, such approach provides an IC chip module that may be implemented in a chip card in a compact manner, and that otherwise facilitates chip card compliance with various industry standards. For example, in contemplated embodiments, the chip card may be provided as an ID-1 sized card and otherwise compliant with ISO/IEC Standard 7810, hereby incorporated by reference.

In some implementations, the first plurality of contact pads may provide a biometric signal comprising at least one of an electrocardiogram (ECG) signal and a fingerprint signal (e.g. a signal indicative of an individual's electrical heart activity and/or fingerprint). In that regard, the first IC chip may comprise a processor for processing the biometric signal in relation to a corresponding predetermined biometric signature stored in memory of the first IC chip, utilizing preprogrammed instructions/algorithms stored in the memory. As may be appreciated, the predetermined biometric signature may be unique to an individual to whom the chip card has been issued for exclusive use (e.g. use to make payments against a payment account administered by or on behalf of a payment institution issuer of the chip card). Such processing may be conducted to authenticate a user as being the authorized issuee of the chip card, wherein upon such authentication, the first IC chip may enable, or unlock, the chip card for use with a chip card reader (e.g. a contact and/or contactless chip card reader device located at a point-of-sale and operable to transmit/receive communication signals to/from a chip card).

In ECG implementations, the first plurality of contact pads may include first and second pads that are spaced by at least a predetermined distance for separate engagement with first and second appendages of a user to provide an electrocardiogram signal to the first IC chip for processing. By way of example, the predetermined distance may be established to facilitate separate engagement with different fingers of the same hand or of different hands of a card user, wherein a predetermined range of finger and/or hand sizes may be accommodated.

In some embodiments, to facilitate electrical interconnection of the first plurality of contact pads and the first IC chip, each of the contact pads may be electrically interconnected through the substrate to a corresponding electrically conductive contact that may be supportably interconnected to the inward-facing side of the substrate and electrically interconnected to the first IC chip. For example, the contacts corresponding with the first plurality of contact pads may be interconnected to the first IC chip via conductive traces/pads supportably interconnected to the inward-facing side of the substrate or via wire bonding.

In contemplated embodiments, a chip card may further include a second plurality of contact pads (e.g. electrically conductive/isolated pads) supportably interconnected to the outward-facing surface of the substrate for selective electrical contact communication with a contact chip card reader (e.g. via contact with electrically conductive pins of the contact chip card reader). In that regard, the second plurality of contact pads may be electrically interconnected to the first IC chip and/or another IC chip supportably interconnected to the inward-facing surface of the substrate, wherein the IC chip comprises a processor for processing payment-related contact communication signals to/from a contact card reader utilizing preprogrammed instructions/algorithms and personalization data (e.g. payment account identification data corresponding with a specific payment account administered by an issuer of the corresponding chip card) stored in memory thereof, e.g. in compliance with ISO/IEC Standard 7816-2.

In some implementations, the second plurality of contact pads may be located for contact communication with a contact chip card reader in compliance with ISO/IEC Standard 7816-2. In that regard, the second plurality of contact pads may be provided to receive electrical signals from a contact chip card reader that comprise both data communication signal and power signal components (e.g. a data communication signal component imposed on a power signal component), wherein the power signal component may power chip card componentry.

In some arrangements, the second plurality of contact pads may be located within a predetermined area within the recess on one side of the chip card. Further, the first plurality of contact pads may be located outside of and adjacent to the predetermined area within the same recess on said one side of the chip card. In such arrangements, the first plurality of contact pads may include first and second pads that are spaced by at least a predetermined distance that is greater than a distance between any two of the second plurality of contact pads.

In some embodiments, the first plurality of contact pads and second plurality of contact pads may be collectively, or combinatively, located in compliance with ISO/IEC Standard 7816-2. For example, the first plurality of contact pads may comprise two contact pads designated as being auxiliary, or nonessential, pads in ISO/IEC Standard 7816-2, and the second plurality of contact pads may comprise at least 5 of the remaining six contact pads, as stipulated in ISO/IEC Standard 7816-2.

In chip card embodiments including a first plurality of contact pads and a second plurality of contact pads, the first and second pluralities of contact pads may be defined together on the outward-facing surface of the substrate in one or more production operations. By way of example, the first and second plurality of contact pads may be defined by copper plating and etching operations, wherein the copper contact pads may be optionally gold flashed.

In some implementations, a chip card may further include a second IC chip supportably interconnected to the inward-facing surface of the substrate. In such arrangements, the second IC chip may be electrically interconnected to the second plurality of contact pads for processing electrical contact communication signals to/from a contact chip card reader. For example, the second IC chip may comprise a processor for processing payment-related, contact communication signals to/from a contact card reader utilizing pre-programmed instructions/algorithms and personalization data (e.g. payment account identification data corresponding with a specific payment account administered by an issuer of the corresponding chip card) stored in memory thereof, e.g. in compliance with ISO/IEC Standard 7816-2.

To facilitate electrical interconnection of the second plurality of contact pads and second IC chip, each of the contact pads may be electrically interconnected through the substrate to a corresponding contact that may be electrically interconnected to the second IC chip. For example, the contacts corresponding with the second plurality of contact pads may be interconnected to the second IC chip via conductive traces/pads supportably interconnected to the inward-facing side of the substrate or via wire bonding.

In some arrangements, one or more of the contacts corresponding with the first plurality of contact pads may each be electrically interconnected with a corresponding, different one of one or more of the contacts corresponding with the second plurality of contact pads, wherein power and/or data communication signals may be provided therebetween and to/from the first IC chip and second IC chip, as well as the first plurality of contact pads for biometric signal generation.

In some embodiments, the first IC chip may be electrically interconnected to the contacts corresponding with the first plurality of contact pads utilizing flip-chip interconnections supportably interconnected to the inward-facing surface of the substrate or wire-bonded interconnections on the inward-facing side of the substrate. Further, the second IC chip may be electrically interconnected to the contacts corresponding with the second plurality of contact pads utilizing wire-bonded interconnections on the inward-facing side of the substrate or flip-chip interconnections supportably interconnected to the inward-facing surface of the substrate.

In some embodiments, a chip card may further include a first antenna for contactless communications with a contactless chip card reader (e.g. contactless communications via radio frequency (RF) electromagnetic signals). In that regard, the first IC chip and/or the second IC chip (if provided) may be electrically interconnected to the first antenna for processing payment-related, contactless communication signals to/from a contactless chip card reader utilizing a processor and preprogrammed instructions/algorithms and personalization data (e.g. payment account identification data corresponding with a specific payment account administered by an issuer of the corresponding chip card) stored in memory thereof, e.g. in compliance with ISO/IEC Standard 14443. In that regard, the first antenna, and an optional metallic member (e.g. a second antenna), as discussed below, may be provided to receive RF electromagnetic signals from a contactless chip card reader to yield electrical signals that comprise both data communication signal and power signal components, wherein the power signal component may power chip card componentry.

In one approach, the first antenna may be supportably interconnected to the substrate. For example, the first antenna may be supportably interconnected to the inward-facing surface of the substrate. In contemplated arrangements, the first antenna may be disposed in non-overlapping relation to the contacts corresponding with the first plurality of contact pads and/or the contacts corresponding with the second plurality of contact pads.

In arrangements in which a first antenna is provided for contactless communication with a contactless chip card reader, contactless signals received from the contactless chip reader (e.g. RF electromagnetic signals) may be utilized for both payment-related data transmission to and for powering of the first IC chip and/or the second IC chip (if provided). In such embodiments, the card body may further comprise a metallic member for channeling the contactless communication signals received from a contactless chip card reader toward the first antenna. In that regard, the metallic member may be disposed in non-overlapping relation to the contacts corresponding with the first plurality of contact pads and/or the contacts corresponding with the second plurality of contact pads.

In some arrangements, the metallic member may include a second antenna disposed in spaced relation to the first antenna and in non-overlapping relation to the contacts corresponding with the first plurality of contact pads and/or the second plurality of contact pads. In some implementations, the second antenna may comprise one or more outer loop(s) and one or more inner loop(s) that define a continuous electrically conductive pathway, and wherein the inner loop(s) is disposed in opposing, spaced relation to the first antenna (e.g. for inductive coupling therewith to provide both data communication and power signal components), and in non-overlapping relation to the contacts corresponding with the first plurality of contact pads and/or the contacts corresponding with the second plurality of contact pads.

Optionally, the second antenna may be provided with an energy storage component, e.g. a capacitor and/or battery, capable of storing a sufficient amount of electrical energy to at least initially power the provision of the biometric signal by the first plurality of contact pads and processing thereof by the first IC chip. Such initial processing by the first IC chip may be completed to authenticate a user, whereupon the first IC chip and/or second IC chip (if included) may be unlocked, or enabled, for communications with a contact chip card reader and/or contactless chip card reader.

In some implementations, the card body may include a prelaminated member that includes the metallic member laminated between first and second layers (e.g. polymer-based layers). In turn, first and second core layers (e.g. polymer-based layers) may be co-laminated to opposing sides of the prelaminated member. In turn, the card body recess may be formed (e.g. via milling) to extend into at least a portion of one or both of the first and second core layers on one side of the chip card.

Additional features and advantages of the present invention will become apparent upon consideration of the description that follows.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such embodiments or other embodiments and with various modifications required by the particular application(s) or use(s) of the present invention.

Figure 1A:
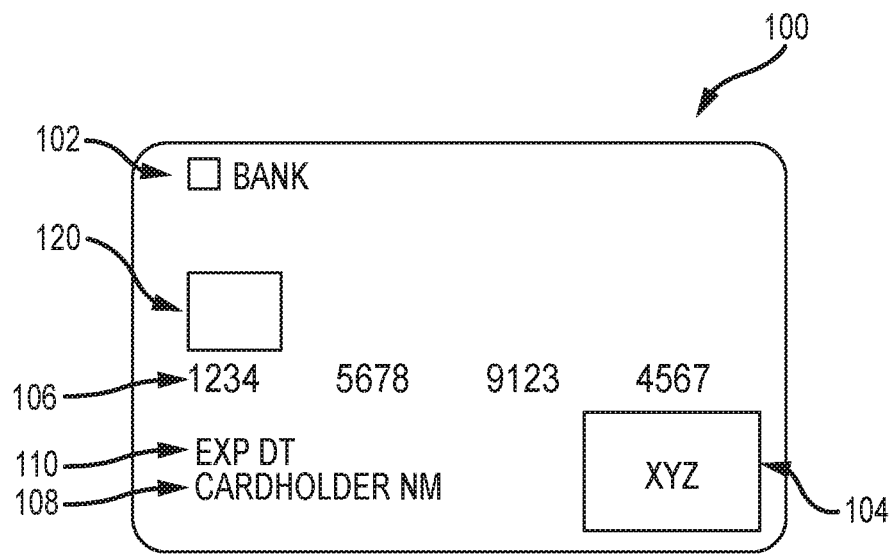
FIGS. 1A and 1B are front and back views, respectively, of a chip card embodiment.
Figure 1B:
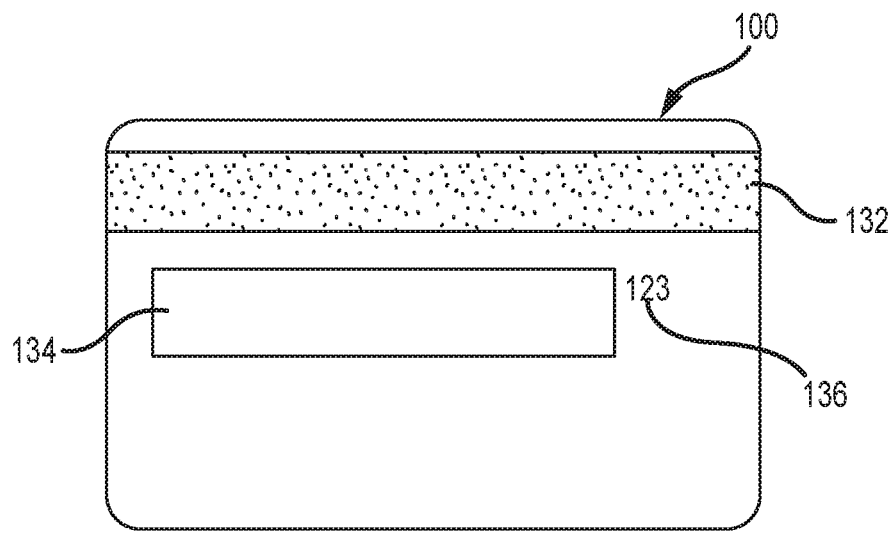

FIGS. 1A and 1B are front and back views, respectively, of an embodiment of a payment chip card (100). As shown in FIG. 1A, a front face of chip card (100) may include an issuer payment institution identifier (102) (e.g. a name and/or logo) and a payment processing institution identifier (104) (e.g. a name and/or logo). Further, personalization data corresponding with a single specific payment account administered by the issuer payment institution may be provided on the front face of the chip card (100). For example, the personalization data may include payment account identification indicia (106) (e.g. a payment account number or other indicia that may be correlated to a payment account administered by the issuer payment institution), a card holder name (108) (e.g. the name of an individual to whom the chip card has been issued by the issuer payment institution), and an expiration date (110) associated with the given payment account. Additionally, a region (120) may be provided for inclusion of an integrated circuit (IC) chip. For contact chip cards, region (120) may also receive a contact plate having contact pads for electrical contact interface with a contact chip card reader. Further, region (120) may receive an IC chip module in a recess thereof, as will be further described.

As shown in FIG. 1B a back face of chip card (100) may include a magnetic stripe (132) comprising magnetically encoded data corresponding with the given payment account associated with the chip card (100). Additionally, a signature block (134) may be provided for receiving a signature by the individual issue to whom the chip card (100) is issued for exclusive use. Further, at least one card security code (136) may be provided, wherein the card security code (136) may be required in connection with use of the card (100) to complete a given payment transaction.

In a modified arrangement, the payment processor identifier (104) and/or all or a portion of the personalization data may be provided on a back face of chip card (100). For example, the payment processor identifier (104) may be provided in a bottom right region of the back face of chip card (100), and the payment account identification indicia (106), expiration data (110) and card holder name (108) may be provided in successive rows below signature block (134).

In various embodiments, the payment account identification indicia (106) may be embossed or printed for viewing from the front face or back face of chip card (100). In that regard, when embossing is utilized, the embossed payment account identification indicia (106) may be located to the side of region (120) (e.g. to the right side of region (120) when viewing the front face of chip card (100)), thereby accommodating a region (120) of increased height for receipt of an IC chip module in a recess thereof, as described below.

Figure 2B:
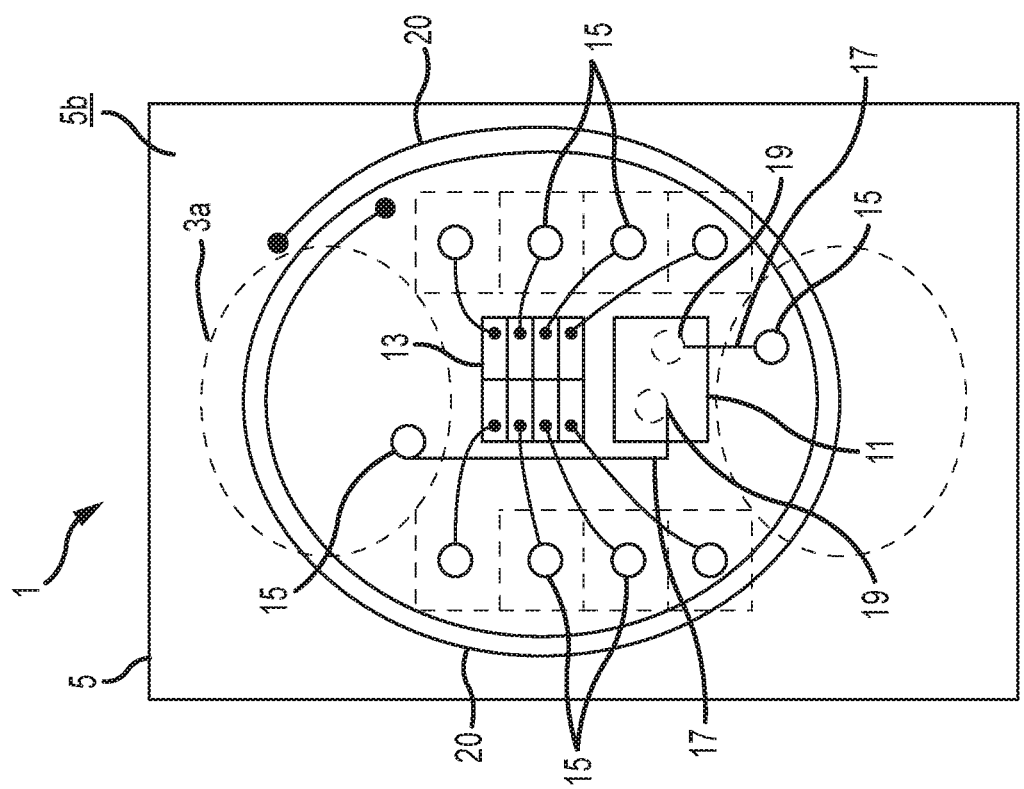
FIGS. 2A and 2B are front and back views, respectively, of an integrated circuit (IC) chip module embodiment employable in a chip card.
Figure 2A:
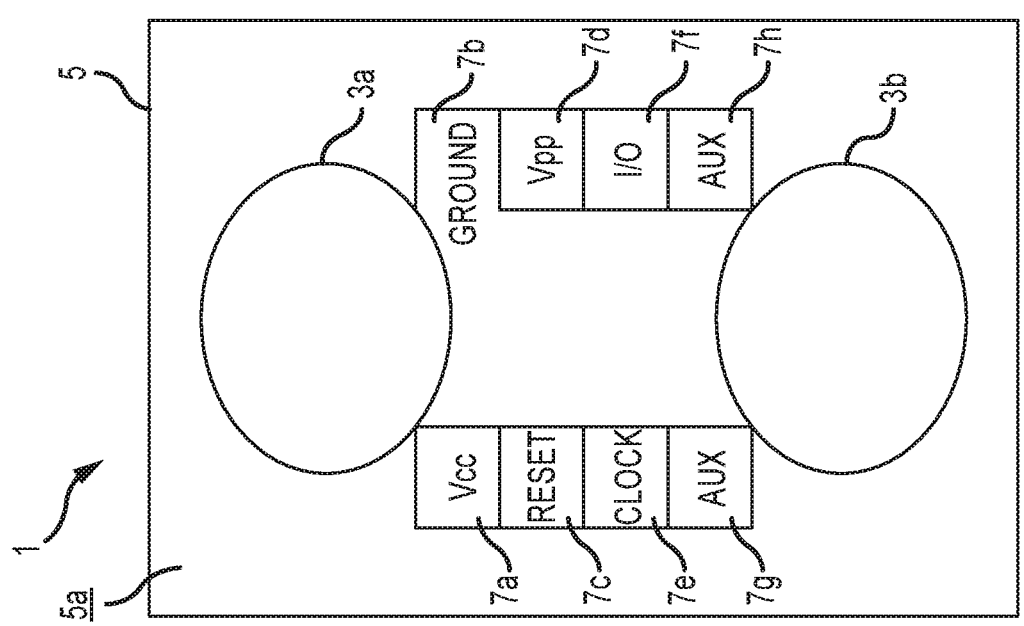

Reference is now made to FIGS. 2A and 2B which illustrate front and back views, respectively, of one embodiment of an integrated circuit (IC) chip module (1) for use in a chip card, e.g. for use within or at least partially within a region of a payment chip card corresponding with region (120) of chip card (100) referenced above. More particularly, the IC chip module (100) may be provided for positioning within a recess defined on one side (e.g. a front face) of a chip card.

In the embodiment shown in FIG. 2A, IC chip module (1) may include a first plurality of contact pads (3a, 3b) (e.g. electrically conductive and isolated pads such as copper pads that may be gold-plated) supportably interconnected to an outward-facing surface (5a) of a substrate (5) (e.g. an electrically nonconductive substrate such as a glass epoxy substrate) for contact engagement with at least one appendage of a user. Contact pads (3a, 3b) may function as biometric sensor pads to provide a biometric signal, as will be further described. Additionally, a second plurality of contact pads (7a-7h) (e.g. electrically conductive and isolated pads such as copper pads that may be gold-plated) may be supportably interconnected to outward-facing surface (5a) of substrate (5), at least a portion of which are located for contact with a contact chip card reader to transmit/receive electrical communication signals (e.g. communication signals associated with a given payment transaction), in compliance with ISO/IEC Standard 7816-2. In that regard, the second plurality of contact pads (7a-7h) may be provided to receive electrical signals from a contact chip card reader that may comprise data communication signal and power signal components (e.g. a data communication signal component imposed on a power signal component), wherein the power signal component may power chip card componentry.

As shown in FIG. 2B, IC chip module (1) may also include a first integrated circuit (IC) chip (11) supportably interconnected to an inward-facing surface (5b) of the substrate (5) and electrically interconnected to the first plurality of contact pads (3a, 3b) for processing an electrical biometric signal received therefrom. In that regard, first IC chip (11) may comprise a processor for processing the biometric signal in relation to a corresponding predetermined biometric signature stored in memory of the first IC chip (11), utilizing preprogrammed instructions/algorithms stored in the memory. As may be appreciated, the predetermined biometric signature may be unique to an individual to whom a corresponding chip card has been issued for exclusive use (e.g. use to make payments against a payment account administered by or on behalf of a payment institution issuer of the chip card). Such processing may be conducted to authenticate a user as being the authorized issuee of the chip card, wherein upon such authentication, the first IC chip (11) may enable, or unlock, the corresponding chip card for use with a chip card reader (e.g. a contact and/or contactless chip card reader device located at a point-of-sale and operable to transmit/receive communication signals to/from a chip card).

In that regard, as further shown in FIG. 2B, a second IC chip (13) may be supportably interconnected to an inward-facing surface (5a) of the substrate (5) and electrically interconnected to at least a portion of the second plurality of contact pads (7a-7h) for processing electrical communication signals received from/transmitted to a contact chip reader, e.g. wherein the portion of the second plurality of contact pads (7a-7h) includes at least 5 of contact pads (7a-7f) that are provided with a second IC chip 13 in compliance with ISO/IEC Standard 7816-2. In that regard, second IC chip (13) may comprise a processor for processing payment-related contact communication signals to/from a contact card reader utilizing preprogrammed instructions/algorithms and personalization data (e.g. payment account identification data corresponding with a specific payment account administered by an issuer of the corresponding chip card) stored in memory thereof, e.g. in compliance with ISO/IEC Standard 7816-2.

For purposes of illustrating the noted electrical interconnections, FIG. 2B shows the first plurality of contact pads (3a, 3b) of FIG. 2A in phantom lines, and the second plurality of contact pads (7a-7h) of FIG. 2A in phantom lines. As shown, each of the first plurality of contact pads (3a, 3b) and second plurality of contact pads (7a-7h) may be electrically interconnected through substrate (5) (e.g. via metalized vias) to corresponding electrically-conductive contacts (15) supportably interconnected to the inward-facing surface (5b) of substrate (5). In turn, some or all of the contacts (15) corresponding with the second plurality of contact pads (7a-7h) may be electrically interconnected (e.g. via wire bonded interconnections) with different corresponding ones of a plurality of contact regions provided on an inward-facing side of second IC chip (13).

The contacts (15) corresponding with the first plurality of contact pads (3a, 3b) may be electrically interconnected to first IC chip (11) via metal traces (17) and metal pads (19) (shown in phantom lines) supportably interconnected to the inward-facing surface (5b) of the substrate (5) for contact with contact regions provided on an upward-facing side of first IC chip (13). In turn, the first IC chip (11) may be oriented for flip-chip interconnection to the metal pads (19).

While not shown, one or more of the contacts (15) corresponding with the first plurality of contact pads (3a, 3b) may each be electrically interconnected with a corresponding different one of one or more of the contacts (15) corresponding with the second plurality of contact pads (7a-7h), wherein power and/or data communication signals may be provided therebetween and to/from the first IC chip (11) and second IC chip (13), as well as the first plurality of contact pads (3a, 3b) for biometric signal generation. For example, the contact (15) corresponding with contact pad (7a) (i.e. power supply pad "Vcc") and/or the contact (15) corresponding with contact pad (7b) (i.e. ground pad "Ground") may be electrically interconnected to the contact (15) and/or pad (19) corresponding with contact pad (3a), and/or to the contact (15) and/or pad (19) corresponding with contact pad (3b). Further, one or more contact regions of the first IC chip (11) may each be electrically connected to a corresponding different one of one or more contact regions of the second IC chip (13).

As illustrated in FIG. 2B, IC chip module (1) may further include a first antenna (20) supportably interconnected to the inward-facing surface of the support (5) for payment-related contactless communications with a contactless card reader, e.g. via radio frequency (RF) electromagnetic signals. The first antenna may comprise one or a plurality of electrically conductive, interconnected, and coincidental loops. As shown, the first antenna (20) may be provided in non-overlapping relation to contacts (15). For example, the first antenna (20) may extend around contacts (15).

The first antenna (20) may provide electrical signals to and receive electrical signals from different ones of some or all of the contact regions on the inward-facing side of the second IC chip (13), wherein contactless communication signals may be processed by the second IC chip. In that regard, the first antenna (20) may include a plurality of landing regions (not shown) located for electrical connection to different ones of the contact regions on the inward-facing side of the second IC chip (13). Further, additional features may be provided as described below in relation to FIGS. 3A, 3B and 4.

Returning now to FIG. 2A, the first plurality of contact pads (3a, 3b) may include a first contact pad (3a) that is spaced from a second contact pad (3b) by predetermined distance to facilitate separate engagement with first and second appendages of a user so as to provide an electrocardiogram (ECG) signal to the first IC chip (11) for processing. In that regard, the first and second appendages may be different fingers on the same hand or of different hands of a user.

IC chip module (1) may be sized so that the periphery of substrate (5) may be located into a complimentarily configured recess defined on one side of a card body comprising a chip card (e.g. defined via milling operations). In that regard, the second plurality of contact pads (7a-7h) may be located within a predetermined area within the recess, and the first plurality of contact pads (3a, 3b) may be located outside of and adjacent to that predetermined area within the recess on one side of the chip card. In that regard, the first pad (3a) and second pad (3b) of the first plurality of contact pads (3a, 3b) may be spaced by at least a predetermined distance that is greater than a distance between any two of the second plurality of contact pads (7a-7h), as shown in FIG. 2A.

In some arrangements, including the embodiment shown in FIG. 2A, the second plurality of contact pads (7a-7h) may be located for contact communications with contact pins of a contact card reader in compliance with ISO/IEC Standard 7816-2. In a modified embodiment, two of the second plurality of contact pads (7a-7h) shown in FIG. 2A may be utilized as biometric sensor pads in place of the first plurality of contact pads (3a, 3b) shown in FIG. 2A, For example, contact pad (7g) and contact pad (7h) may be utilized for contact engagement with at least one appendage of a user to provide a biometric signal, while contact pads (7a-7f) may be utilized for electrical contact communication signal transmissions to/from a contact card reader.

Figure 3A:
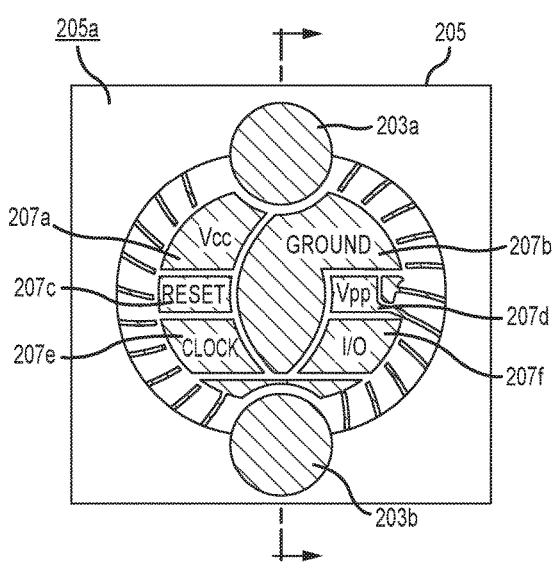
FIGS. 3A and 3B are front and back views, respectively, of another IC chip module embodiment employable in a chip card.
Figure 3B:
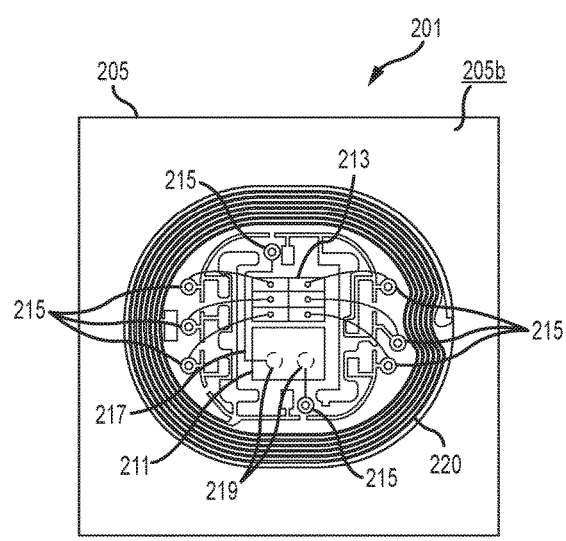

Reference is now made to FIGS. 3A and 3B which illustrate front and back views, respectively, of another embodiment of an IC chip module (201). IC chip module (201) may include a first plurality of contact pads (203a, 203b) supportably interconnected to an outward-facing surface (205a) of a substrate (205) for contact engagement with at least one appendage of a user. Additionally, a second plurality of contact pads (207a-207f) may be supportably interconnected to outward-facing surface (5a) of substrate (205), at least a portion of which are located for electrical contact communications with a contact chip card reader (not shown). In some embodiments, the second plurality of contact pads (207a-207f) may be located in compliance with ISO/IEC Standard 7816-2.

As shown in FIG. 3B, IC chip module (201) may also include a first IC chip (211) supportably interconnected to an inward-facing surface (205b) of substrate (205) and electrically interconnected to the first plurality of contact pads (203a, 203b) as shown in FIG. 3A, for processing a biometric signal received therefrom. Further, a second IC chip (213) may be supportably interconnected to inward-facing surface (205b) of substrate (205) and electrically interconnected to different corresponding ones of the portion of the second plurality of contact pads (207a-207f) for processing contact communication signals to/from a contact chip reader.

As shown in FIG. 3B, each of the first plurality of contact pads (203a, 203b) shown in FIG. 3A may be electrically interconnected through substrate (205) to corresponding electrically conductive contacts (215) supportably interconnected to the inward-facing surface (205b) of substrate (205). Similarly, each of the second plurality of contact pads 207a-207f) may be electrically interconnected through substrate (205) to corresponding electrically conductive contacts (215) supportably interconnected to the inward-facing surface (205b) of substrate (205). In turn, some or all of the contacts (215) corresponding with the second plurality of contact pads (207a-207f) may be electrically interconnected (e.g. via wire-bonded interconnections) with different corresponding ones of a plurality of contact regions provided on an inward-facing side of second IC chip (213).

The contacts (215) corresponding with the first plurality of contact pads (203a, 203b) may be electrically interconnected to first IC chip (211) via metal traces (217) and metal pads (219) (shown in phantom lines) provided on the inward-facing surface (205b) of the substrate (205). In turn, the first IC chip (211) may be oriented for flip-chip interconnection to the metal pads (219).

While not shown, one or more of the contacts (215) corresponding with the first plurality of contact pads (203a, 203b) may each be electrically interconnected with a corresponding different one of one or more of the contacts (215) corresponding with the second plurality of contact pads (207a-207f), wherein power and/or data communication signals may be provided therebetween and to/from the first IC chip (211) and second IC chip (213), as well as the first plurality of contact pads (203a, 203b) for biometric signal generation. For example, the contact (215) corresponding with contact pad (207a) and/or the contact (215) corresponding with contact pad (207b) may be electrically interconnected to the contact (215) and/or pad (219) corresponding with contact pad (203a), and/or to the contact (215) and/or pad (219) corresponding with contact pad (203b). Further, one or more contact regions of the first IC chip (211) may each be electrically connected to a corresponding different one or more contact regions of the second IC chip (213).

As illustrated in FIGS. 3B, IC chip module (201) may further include a first antenna (220) supportably interconnected to the inward-facing surface of the support (205) for contactless communications (e.g. RF electromagnetic signals) with a contactless card reader. As shown, the first antenna (220) may be provided in non-overlapping relation to the contacts (215).

The first antenna (220) may be provided for electrical signal transmission to/from different ones of some or all of the contact regions on the inward-facing side of the second IC chip (213). In that regard, the first antenna (220) may include a plurality of landing regions located for electrical contact with different ones of the contact regions of the second IC chip (213) (e.g. via wire-bonded interconnection).

Returning now to FIG. 3A, the first plurality of contact pads (203a, 203b) may include a first contact pad (203a) that is spaced from a second contact pad (203b) by a predetermined distance to facilitate separate engagement of first and second appendages of a user so as to provide an ECG signal to the first IC chip (211) for biometric processing. In that regard, first and second appendages may be different fingers on the same hand or of different hands of a user.

As will be further described, IC chip module (201) may be sized so the periphery of substrate (205) may be located within a complimentarily configured recess defined on one side of a card body comprising a chip card. In that regard, the second plurality of contact pads (207a-207f) may be located within a predetermined area within the recess and the first plurality of contact pads (203a, 203b), may be located outside and adjacent to that predetermined area within the recess on the one side of the chip card. In that regard, the first pad (203a) and second pad (203b) of the first plurality of contact pads (203a, 203b) may be spaced by at least a predetermined distance that is greater than the distance between any two of the second plurality of contact pads (207a-207f), as shown in FIG. 3A.

Figure 4:
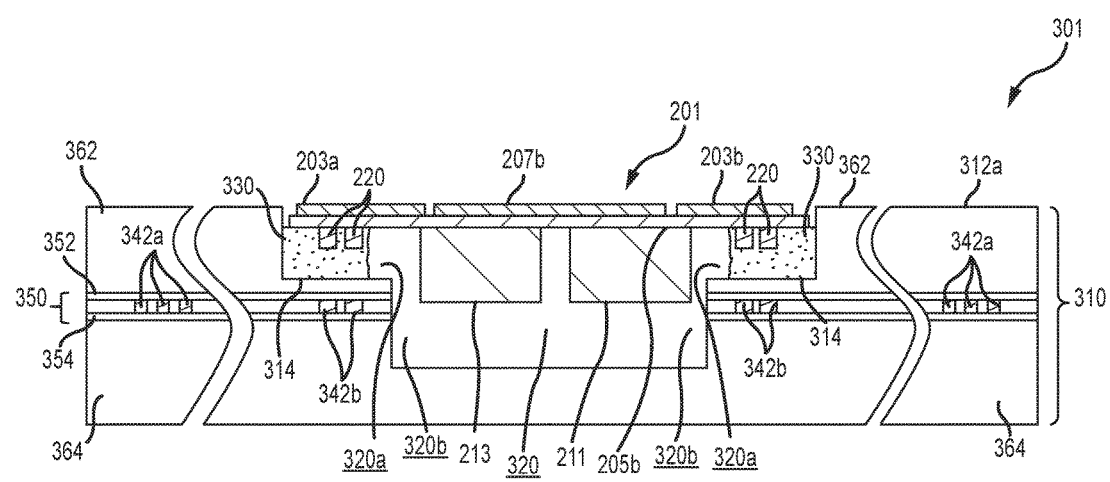
FIG. 4 is a cross-sectional view of a chip card embodiment that comprises the IC chip module embodiment shown in FIGS. 3A and 3B.

Reference is now made to FIG. 4 which illustrates an embodiment of a chip card (301) having a card body (310) with a recess (320) defined on one side (312a) of the card body (310), and having the IC chip module (201) described above located within the recess (320). As shown, recess (320) may include an outer first portion (320a) having a first depth, and an inner second portion (320b) having a second depth that is greater than the first depth, wherein a ring-shaped landing (314) is defined by card body (310) to support the IC chip module (201). More particularly, the peripheral portion of the IC chip module (201) may be supportably interconnected to the card body (310) of chip card (301) at the landing (314) via interconnection material (330) (e.g. an adhesive such as a hot melt adhesive, a light curable adhesive, etc.).

Card body (310) may include a metallic member of a ring-shaped configuration for receiving and channeling RF electromagnetic signals between a contactless chip reader and first antenna (220) of IC chip module (201). More particularly, in the illustrated embodiment, the metallic member may comprise a second antenna (342a, 342b) having one or more outer loop(s) (342a) and one or more inner loop(s) (342b), wherein the outer loop(s) (342a) and inner loop(s) (342b) define a continuous, electronically conductive pathway. As shown, the inner loop(s) (342b) is disposed in opposing, spaced relation to the first antenna (220) of the IC chip module (201) for non-contact coupling therewith (e.g. inductive coupling). In other arrangements, a direct electrical interconnection may be provided between second antenna (342a, 342b) and the first antenna (220).

The second antenna (342a, 342b) may be provided so that a minimum cross-dimension the outer loop(s) 342a is greater than a maximum cross-dimension of the inner loops (342a) (e.g. at least 2 times greater). As may be appreciated, both outer loop(s) (342a) and inner loop(s) (342b) may comprise any number of loops greater/lesser than that shown in FIG. 4. As shown, the inner second portion (320b) of recess (320) may extend through the inner loop(s) (342b).

Optionally, the second antenna (342a, 342b) may be provided with an energy storage component, e.g. a capacitor and/or battery, capable of storing a sufficient amount of electrical energy to at least initially power the provision of the biometric signal by the first plurality of contact pads (203a, 203b) and processing thereof by the first IC chip (211). Such initial processing by the first IC chip (211) may be completed to authenticate a user, whereupon the first IC chip (211) and/or second IC chip (213) (if included) may be unlocked, or enabled, for communications with a contact chip card reader and/or contactless chip card reader.

In the embodiment illustrated in FIG. 4, the metallic member, and more particularly the second antenna (342a, 342b) may be provided in a prelaminated member (350). The prelaminated member (350) may include the second antenna (342a, 342b), and optional capacitor and/or battery, laminated between opposing first and second layers (352), (354), each comprising a polymer-based material (e.g. a PET material). In turn, the prelaminated member (350) may be laminated between opposing first and second core layers (362, 364), each comprising a polymer-based material (e.g. a PVC material). The second antenna (342a, 342b) may comprise aluminum disposed on a first side of a substrate, with loop start and loop end locations extended through the substrate to a second side of the substrate with a bridge therebetween on the second side.

Figure 5:
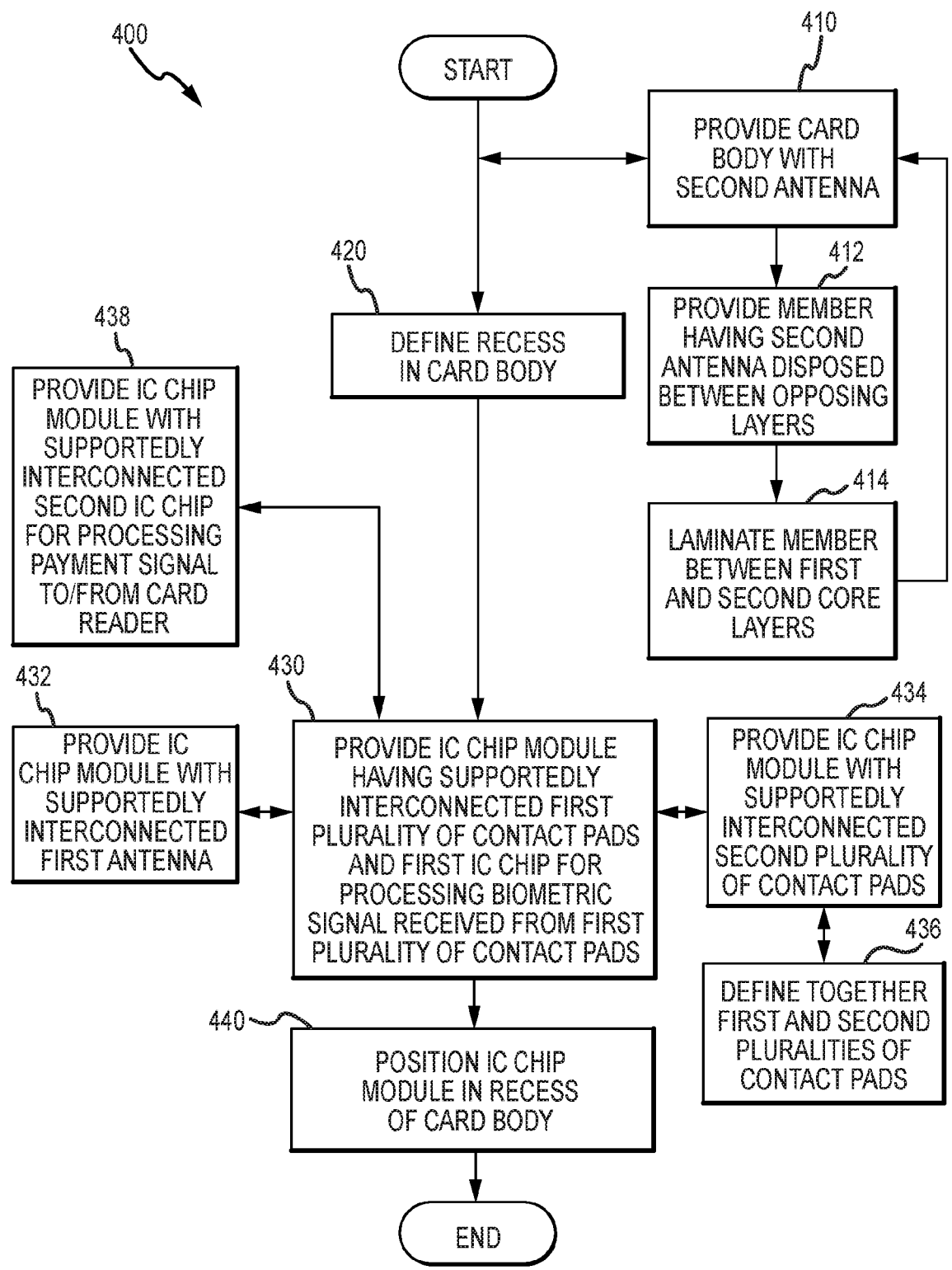
FIG. 5 illustrates an embodiment of a method of providing a chip card.

Reference is now made to FIG. 5 which illustrates one embodiment of a method of providing a chip card, including for example chip card embodiment (100) or chip card embodiment (301) described above, and includes the steps of defining a recess in a card body (420), providing an IC chip module (430), and positioning the IC chip module in the recess of the card body (440). The provided IC chip module may include a first plurality of contact pads supportably interconnected to an outward-facing surface of a substrate for contact engagement with at least one appendage of a user, and a first IC chip supportably interconnected to an inward-facing surface of the substrate and electrically interconnected to the first plurality of contact pads for processing a biometric signal received therefrom. In the later regard, the first IC chip may be provided to process the biometric signal in relation to a predetermined biometric signature of an authorized issueee of the chip card, and upon authentication of the biometric signal, to enable or unlock the chip card (e.g. for signal communications with a payment transaction chip card reader).

The IC chip module may be further provided with a first antenna supportably interconnected to the inward-facing surface of the substrate (432) for contactless payment signal transmissions to/from a contactless chip card reader and/or a second plurality of contact pads supportably interconnected to the outward-facing surface of the substrate (434) for contact payment signal transmissions to/from a contact chip card reader. In the later regard, the first and second pluralities of contact pads may be defined together (436) in one or more production operations, e.g. via copper plating and etching operations.

In some contemplated embodiments, the IC chip module may be provided with a second IC chip supportably interconnected to the inward-facing surface of the substrate (438) for processing a payment signal to/from a chip card reader. For example, the second IC chip may be electrically interconnected to the second plurality of contact pads for processing contact payment signal transmissions to/from a contact chip card reader. Additionally or alternatively, the second IC chip may be electrically interconnected to the first antenna for processing contactless signal transmissions to/from a contactless chip card reader. In such embodiments, the first IC chip and second IC chip may be electrically interconnected so that the second ID chip is locked, or otherwise not enabled, to process signals to/from a chip card reader until and unless the first IC chip has processed and thereby authenticated the biometric signal so as to enable, or unlock, the second IC chip for processing signal transmission to/from a chip card reader.

In some implementations, prior to the defining of a recess in a card body (420), the method may include the provision of such card body having a second antenna included therewith (410), wherein the second antenna is provided for coupling with the first antenna in conjunction with contactless signal transmissions to/from a contactless chip card reader. In that regard, a member may be provided having the second antenna disposed between opposing layers (412). In turn, the member may be laminated between first and second core layers as part of the card body (414). As may be appreciated, additional method embodiment features may encompass the teachings set forth hereinabove in relation to the embodiments described in relation to FIGS. 1-4.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only preferred embodiment and variants thereof have been shown and described and that all changes and modifications that come within the spirit of the invention are desired to be protected.

What is claimed is:

1. A chip card comprising:
   a card body and an integrated circuit (IC) chip module located in a recess provided by the card body on one side of the chip card-:-, wherein said IC chip module includes:

a substrate having outward-facing and inward-facing surfaces;

a first plurality of contact pads supportably interconnected to said outward-facing surface of the substrate for contact engagement with at least one appendage of a user;

a first IC chip supportably interconnected to the inward-facing surface of the substrate and electrically interconnected to the first plurality of contact pads for processing a biometric signal received therefrom; and, a second plurality of contact pads supportably interconnected to said outward-facing surface of the substrate for contact communication with a contact chip card reader; and, a first antenna for contactless communication with a contactless chip card reader, wherein said first antenna is supportably interconnected to said inward-facing surface of said substrate of the IC chip module, wherein each of said first plurality of contact pads and second plurality of contact pads is electrically interconnected through said substrate to a different corresponding electrically conductive contact supportably interconnected to the inward-facing surface of the substrate, and wherein said first antenna is disposed in in non-overlapping relation to each of said contacts corresponding with said first plurality of contact pads and said second plurality of contact pads.

2. A chip card as recited in claim 1, wherein said biometric signal is one of an electrocardiogram signal and fingerprint signal.

3. A chip card as recited in claim 2, wherein said first plurality of contact pads include first and second pads spaced by at least a predetermined distance for separate engagement with first and second appendages of a user to provide an electrocardiogram signal to said first IC chip for processing.

4. A chip card as recited in claim 1, further comprising:
a second IC chip supportably interconnected to the inward-facing surface of the substrate of the IC chip module and electrically interconnected to said second plurality of contact pads and said first antenna for processing contact communication signals to/from a contact chip card reader and contactless communication signals to/from a contactless chip card reader.

5. A chip card as recited in claim 1, wherein said first and second plurality of contact pads are formed, together on said outward facing surface of said substrate by one or more production operations.

6. A chip card as recited in claim 1, wherein said second plurality of contact pads are located within a predetermined area within said recess on said one side of the chip card, and said first plurality of contact pads are located outside of and adjacent to said predetermined area and within said recess on said one side of the chip card.

7. A chip card comprising:
card body and an integrated circuit (IC) chip module located in a recess provided by the card body on one side of the chip card, wherein said IC chip module includes:
a substrate having outward-facing and in-ward facing surfaces;
a first plurality of contact pads supportably interconnected to said outward-facing surface of the substrate for contact engagement with at least one appendage of a user;

a first IC chip supportably interconnected to the inward-facing surface of the substrate and electrically interconnected to the first plurality of contact pads for processing a biometric signal received therefrom; and a second plurality of contact pads supportably interconnected to said outward-facing surface of the substrate for contact communication with a contact chip card reader, wherein said second plurality of contact pads are located within a predetermined area within said recess on said one side of the chip card, and said first plurality of contact pads are located outside of and adjacent to said predetermined area and within said recess on said one side of the chip card, and wherein said first plurality of contact pads include first and second pads spaced by at least a predetermined distance that is greater than a distance between any two of said second plurality of contact pads.

8. A chip card as recited in claim 7, wherein said second plurality of contact pads are located for electrical interconnection with said first IC chip in compliance with ISO/IEC Standard 7816-2.

9. A chip card as recited in claim 7, wherein said IC chip module further comprises:
a second IC chip supportably interconnected to the inward-facing surface of the substrate of the IC chip module and electrically interconnected to said second plurality of contact pads for processing contact communication signals to and from a contact chip card reader.

10. A chip card as recited in claim 9, wherein said second plurality of contact pads are located in compliance with ISO/IEC Standard 7816-2.

11. A chip card as recited in claim 9, wherein said first IC chip is electrically interconnected to said first plurality of contact pads utilizing flip-chip interconnections.

12. A chip card as recited in claim 11, wherein said second IC chip is electrically interconnected to said second plurality of contact pads utilizing wire-bonded interconnections.

13. A chip card as recited in claim 7, further comprising:
a first antenna for contactless communication with a contactless chip card reader, wherein said first antenna is supportably interconnected to said inward-facing surface of said substrate of the IC chip module.

14. A chip card as recited in claim 13, further comprising:
a second antenna for channeling electromagnetic waves received from a contactless chip card reader toward the first antenna, wherein the first antenna is operable to utilize said electromagnetic waves to power operation of said first IC chip.

15. A chip card as recited in claim 7, wherein said first and second plurality of contact pads are formed together on said outward-facing surface of said substrate by one or more production operations.

16. A chip card comprising:
a card body and an integrated circuit (IC) chip module located in a recess provided by the card body on one side of the chip card, wherein said IC chip module includes:
a substrate having outward-facing and inward-facing surfaces;
a first plurality of contact pads supportably interconnected to said outward-facing surface of the substrate for contact engagement with at least one appendage of a user;

a first IC chip supportably interconnected to the outward-facing surface of the substrate and electrically interconnect to the first plurality of contact pads for processing a biometric signal received therefrom; and
a second plurality of contact pads supportably interconnected to said outward-facing surface of the substrate for contact communication with a contact chip reader, wherein said first and second plurality of contact pads are collectively located for electrical interconnection with said first IC chip in compliance with ISO/IEC Standard 7816-2.

17. A chip card as recited in claim 16, wherein said first IC chip is electrically interconnected to said first and second plurality of contact pads utilizing wire-bonded interconnections.

18. A chip card as recited in claim 16, wherein said IC chip module further comprises:
a second IC chip supportably interconnected to the inward-facing surface of the substrate of the IC chip module and electrically interconnected to said second plurality of contact pads for processing contact communication signals to and from contact chip card reader.

19. A chip card as recited in claim 16, further comprising:
a first antenna for contactless communication with a contactless chip card reader, wherein said first antenna is supportably interconnected to said inward-facing surface of said substrate of the IC chip module.

20. A chip card as recited in claim 19, further comprising:
a second antenna for channeling electromagnetic waves received from a contactless chip card reader toward the first antenna, wherein the first antenna is operable to utilize said electromagnetic waves to power operation of said first IC chip.

21. A chip card comprising:
a card body and an integrated circuit (IC) chip module located in a recess provided by the card body on one side of the chip card, wherein said IC chip module includes:
a substrate having outward-facing and inward-facing surfaces;
a first plurality of contact pads supportably interconnected to said outward-facing surface of the substrate for contact engagement with at least one appendage of a user;
a first IC chip supportably interconnected to the inward-facing surface of the substrate and electrically interconnected to the first plurality of contact pads for processing a biometric signal received therefrom; and,
a second plurality of contact pads supportably interconnected to said outward-facing surface of the substrate for contact communication with a contact chip card reader; and,
a first antenna for contactless communication with a contactless chip card reader; and,
a metallic member for channeling electromagnetic waves received from a contactless chip card reader toward the first antenna, wherein the first antenna is operable to utilize said electromagnetic waves to power operation of said first IC chip.

22. A chip card as recited in claim 21, wherein said first antenna is supportably interconnected to said inward-facing surface of the said substrate.

23. A chip card as recited in claim 21, wherein each of said first plurality of contact pads and second plurality of contact pads is electrically interconnected through said substrate to a different corresponding electrically conductive contact supportably interconnected to the inward-facing surface of the substrate, and wherein said first antenna is disposed in non-overlapping relation to each of said contacts corresponding with said first plurality of contact pads and said second plurality of contact pads.

24. A chip card as recited in claim 23, wherein said metallic member comprises:
a second antenna disposed in spaced relation to said first antenna and in non-overlapping relation to each of said contacts corresponding with said first and second plurality of contact pads.

25. A chip card as recited in claim 24, wherein said second antenna comprises:
at least one outer loop and one inner loop, wherein said at least one outer loop extends about at least a portion of said at least one inner loop, and wherein the at least one inner loop is disposed in spaced relation to said first antenna and in non-overlapping relation to each of said contacts corresponding with said first and second plurality of contact pads.

26. A chip card as recited in claim 2, wherein said card body comprises:
a prelaminated member that includes said second antenna laminated between first and second layers; and,
first and second core layers co-laminated to opposing sides of said prelaminated member, wherein said recess extends in to at least a portion of at least one of said first and second core layers on said one side of the chip card.

27. A chip card as recited in claim 26, wherein said first plurality of contact pads are located within a predetermined area within said recess on said one side of the chip card, and said second plurality of contact pads are located outside of and adjacent to said predetermined area and within said recess on said one side of the chip card, and further comprising:
a second IC chip supportably interconnected to the inward-facing surface of the substrate and electrically interconnected to said first plurality of contact pads, said first IC chip and said first antenna for processing contact and contactless communication signals, wherein the first antenna is operable to utilize said electromagnetic waves to power operation of said second IC chip.

* * * * *

UNITED STATES PATENT AND TRADEMARK OFFICE
CERTIFICATE OF CORRECTION

PATENT NO. : 10,089,568 B2
APPLICATION NO. : 15/566602
DATED : October 2, 2018
INVENTOR(S) : Barry Mosteller Page 1 of 1

It is certified that error appears in the above-identified patent and that said Letters Patent is hereby corrected as shown below:

In the Claims

Column 13, Line 26, delete the second instance of "in"

Column 15, Lines 1 and 2, delete "outward" and insert therefore --"inward"--

Column 15, Line 3, delete "interconnect" and insert therefore --"interconnected"--

Signed and Sealed this
First Day of January, 2019

Andrei Iancu
*Director of the United States Patent and Trademark Office*